Figure 1:
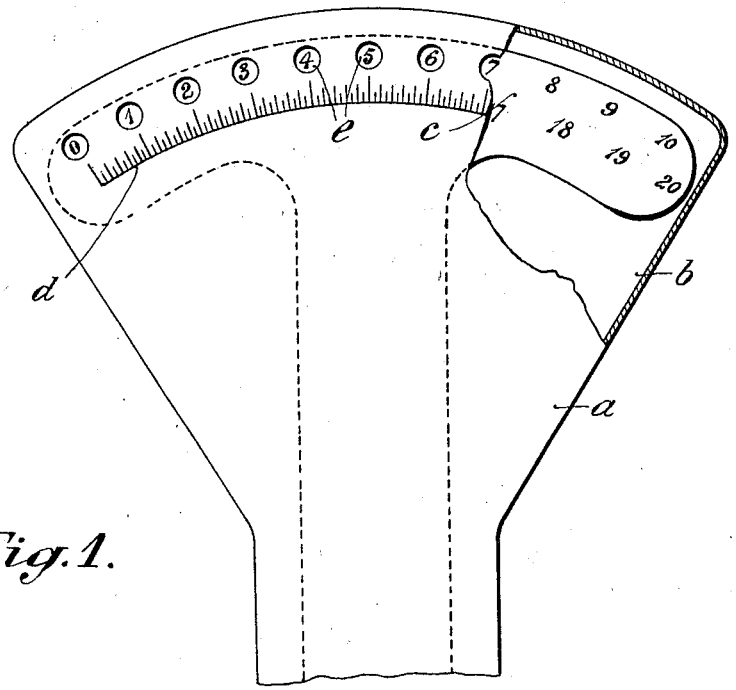

June 5, 1923.   S. WISTOFT   1,458,093
DIAL FOR SCALES
Filed Oct. 7, 1921   2 Sheets-Sheet 1

Inventor
S. Wistoft
By Marks & Clerk
Attys.

June 5, 1923.

S. WISTOFT

DIAL FOR SCALES

Filed Oct. 7, 1921

1,458,093

2 Sheets-Sheet 2

Inventor
S. Wistoft
By Marks & Clerk
Attys.

Patented June 5, 1923.

1,458,093

UNITED STATES PATENT OFFICE.

SÓREN WISTOFT, OF COPENHAGEN, DENMARK.

DIAL FOR SCALES.

Application filed October 7, 1921. Serial No. 506,127.

*To all whom it may concern:*

Be it known that I, SÓREN WISTOFT, subject of the King of Denmark, residing at Copenhagen, Denmark, have invented certain new and useful Improvements in Dials for Scales, of which the following is a specification.

Scales of the pendulum type are known which are so arranged that they will either weigh from 0 to p kilograms or, after an adjustment, from p to 2p kilograms. At a certain position of the pointer, therefore, the load may either be n kilograms or p+n kilograms, if n be a given value between 0 and p.

In using such a scale it is, of course, necessary that the reading can be performed under such conditions, that one cannot read n kilograms, if the load actually is p+n kilograms, and vice versa. As is the case with a scale which can be adjusted for weighing under two different conditions, but both starting at a load of 0 kilogram, a scale of the hereinbefore described kind may be provided with two differently coloured dials and may, in known manner, be arranged to show, on having been adjusted from the one weighing mode to the other, a notice, which tells which of the two dials is to be used for the respective adjustment. Such an arrangement will, certainly, allow a correct reading to be obtained, but it, nevertheless, does not render it impossible, that the false dial is read, and in this respect the conditions with a scale of the kind mentioned are rendered more difficult by the spaces between the division marks being equal, be it that the scale is set for 0–p kilograms or for p–2p kilograms, whereas the spaces between the division marks of the two dials are, naturally, unequal on a scale which, according to conditions, can weigh from 0 to m kilograms or 0 to 2m kilograms.

The present invention relates to a dial by which the said difficulty, namely the possibility of a false reading, is obviated. The characteristic feature of the said dial consists therein that it possesses a movable plate member which, on the scale being adjusted, is automatically made to assume one or the other of two positions, in each of which one or the other of two series of figures, which correspond to the principal division marks on the dial, for the two different weighing conditions, is visible, whilst the other series is covered.

In the following description the dial is described and shown for being read on the one side only, namely that turned towards the dealer, but it will be evident therefrom that the conditions will be the same, if the dial is to be arranged to be simultaneously read on both sides, by both dealer and purchaser.

In the accompanying drawing

Figure 2:
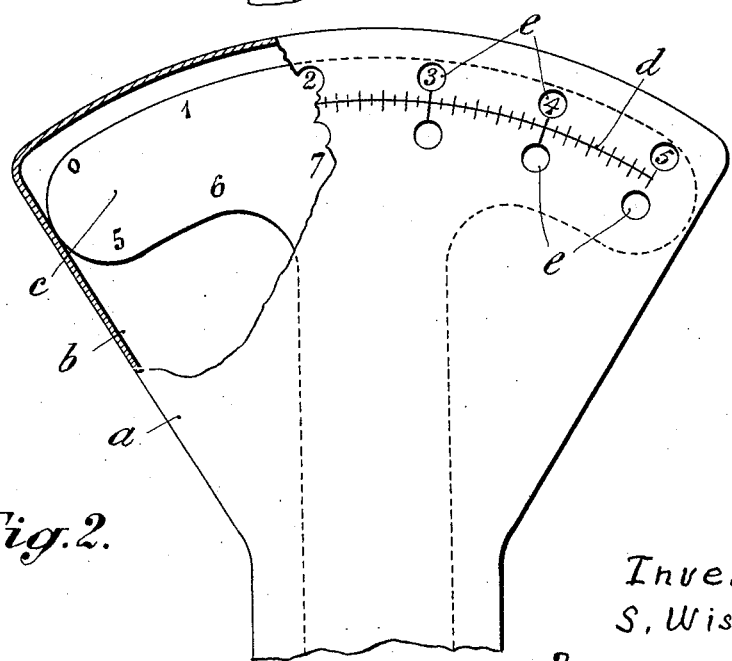
Figure 3:
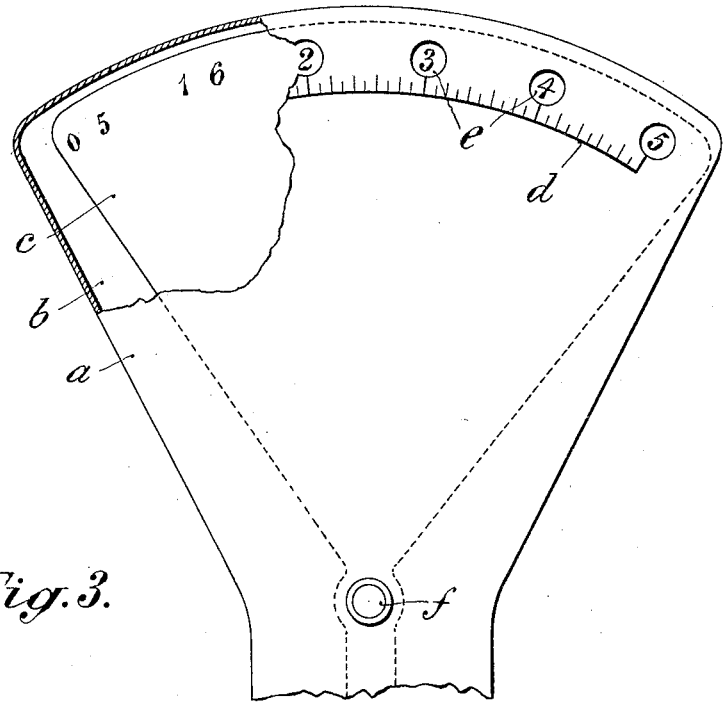

Figs. 1 to 3 show in front elevation four different constructional forms of the dial in question, Fig. 1 showing a dial for a scale which, according to its adjustment, will weigh from 0–1 kg. or from 1–2 kg., respectively, whilst Figs. 2–3 show dials for a scale which, according to its adjustment, can weigh from 0–500 grammes or 500–1000 grammes, respectively.

In Figs. 1–3 the hereinbefore mentioned movable plate member *c* is disposed between a front wall *a* and a rear wall *b d* is the division on the outer side of the front wall.

According to Fig. 1 there is provided above each of the division marks corresponding to the hundreds of grammes a windowhole *e* in the front wall *a*, whilst the figures corresponding to these divisions are marked in two rows on the movable member *c* in such a manner, that the figures 0, 1, 2, . . . 10 are in the upper row, whilst the figures 10, 11, 12, . . . 20 (of which only four are visible in the drawing) are in the lower row. The said movable member *c* is guided in any suitable manner and coupled to the adjusting device of the scale in such a manner that on said adjustment being performed, it will automatically be moved in a vertical direction either up or down, namely down into the position shown in the drawing when the scale is set to weigh from 0–1 kg., or up from such position into a position at which the lower row of figures become visible each through its hole *e*, when the scale is set to weigh from 1–2 kg. The figures in the lower row are therefore arranged vertically below and at the same distance from the corresponding figures in the upper row. At either position of the member *c* the row of figures that is not visible in the holes is covered by the front wall *a*.

The constructional form shown in Fig. 2 differs from that shown in Fig. 1 therein, that there are two rows of holes *e* in the front wall *a*, namely one row above and one row below the line *d* proper, the division marks of which line extend to both sides from a circular curved middle line, and that the two rows of figures on the movable member *c* are thus arranged that the figures in the upper row are visible each in its respective hole in the upper row of holes when the member *c* is in its lowermost position, whilst the figures in the lower row are visible in their respective holes *e* in the lower row of holes when the member *c* is in its uppermost position.

In the constructional form shown in Fig. 3 the member *c* is automatically turned around a horizontal pin *f* from one into the other of two positions, when the respective scale is adjusted, and the figures corresponding to the two rows of figures in Fig. 2 are, therefore, arranged in pairs in one circular arc. In the position of the member *c* as shown in Fig. 3 the left hand figure of each pair of figures is visible in each of the holes *e*, corresponding to an adjustment of the scale for weighing from 0–500 grammes. When the scale is set to weigh from 500 gr. to 1 kg. the member *c* will be turned to the left so that the right hand figure of each pair of figures (the figures 5, 6, . . . 10) appear in a hole *e*.

It may be here stated that the constructional form shown in the drawing and hereinbefore described are meant only by way of example, and that many other modifications are possible without departing from the principle of the invention.

I claim:

1. In a scale of the kind on which weighing is possible either from 0–p kilograms or from p to 2p kilograms, a dial, consisting of a front wall, bearing division marks and window holes corresponding therewith, and a rear wall, a movable plate member between the said walls, said member adapted to be moved vertically up and down, on the scale being set to the one or the other of the said weighing modes, on said movable member two rows of figures, corresponding to the said two weighing modes, said rows of figures so arranged that, when the scale is set for the one mode of weighing, the figures of the one row are visible in said window holes in the front wall whilst the other row of figures is covered, and vice versa, when the scale is set for the other mode of weighing, and the said movable member is in the one or the other of its positions, respectively.

2. In a scale of the kind in which weighing is possible either from 0 to p kilograms, or from p to 2p kilograms, a dial consisting of a front wall bearing division marks and window holes corresponding therewith and a rear wall, a movable plate member between said walls, a horizontal pin on which said movable member is adapted to be turned around, into one or the other of two positions on the scale being set to the one or the other mode of weighing, on said movable member the figures corresponding to the said two modes of weighing disposed in pairs on a circular arc in such a manner that the one set of said pairs of figures is visible in the window holes, when the scale, and with it the said movable member is set for the one mode of weighing, and vice versa.

In testimony whereof I affix my signature in the presence of a witness.

SÖREN WISTOFT.

Witness:
H. ERICHSEN.